United States Patent
Hosseini et al.

(10) Patent No.: US 12,356,230 B2
(45) Date of Patent: Jul. 8, 2025

(54) SIDELINK CSI COMPLEXITY MANAGEMENT

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US); Juan Montojo, San Diego, CA (US); Ahmed Elshafie, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/820,864

(22) Filed: Aug. 18, 2022

(65) Prior Publication Data

US 2023/0056484 A1    Feb. 23, 2023

Related U.S. Application Data

(60) Provisional application No. 63/235,600, filed on Aug. 20, 2021.

(51) Int. Cl.
*H04W 24/10* (2009.01)
*H04W 8/24* (2009.01)
(Continued)

(52) U.S. Cl.
CPC ............ *H04W 24/10* (2013.01); *H04W 8/24* (2013.01); *H04W 72/1263* (2013.01); *H04W 92/18* (2013.01)

(58) Field of Classification Search
None
See application file for complete search history.

(56) References Cited

U.S. PATENT DOCUMENTS

| 2020/0145164 A1* | 5/2020 | Cheng ................. H04W 52/265 |
| 2020/0403758 A1* | 12/2020 | Song .................... H04L 5/0048 |
| 2022/0217741 A1 | 7/2022 | Yoshioka et al. |

FOREIGN PATENT DOCUMENTS

| EP | 4057681 A1 | 9/2022 |
| WO | 2020222267 A1 | 11/2020 |

(Continued)

OTHER PUBLICATIONS

3GPP TS 38.214: "3rd Generation Partnership Project, Technical Specification Group Radio Access Network, NR, Physical Layer Procedures for Data (Release 15)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG1, No. V15.13.0 (Jun. 2021), Jun. 30, 2021, pp. 1-106, XP052029955, Section 5.2.1.6, p. 44-p. 45.

(Continued)

*Primary Examiner* — Angela Nguyen
(74) *Attorney, Agent, or Firm* — Paul M. McAdams; Procopio, Cory, Hargreaves & Savitch LLP

(57) ABSTRACT

Aspects of the present disclosure relate to wireless communications, and more particularly, to techniques for channel state information (CSI) reporting. One aspect provides a method for wireless communication by a first user equipment (UE). The method generally includes transmitting, to a second UE, an indication of a capability of the first UE for reporting sidelink channel state information (SL-CSI) to the second UE, receiving, from the second UE, a request for SL-CSI, and reporting SL-CSI to the second UE subject to the capability of the first UE for reporting SL-CSI to the second UE.

21 Claims, 13 Drawing Sheets

(51) Int. Cl.
*H04W 72/1263* (2023.01)
*H04W 92/18* (2009.01)

(56) References Cited

FOREIGN PATENT DOCUMENTS

| | | |
|---|---|---|
| WO | 2021030565 A1 | 2/2021 |
| WO | 2021089020 A1 | 5/2021 |

OTHER PUBLICATIONS

International Search Report and Written Opinion—PCT/US2022/040955—ISA/EPO—Nov. 25, 2022.

* cited by examiner

SIDELINK CSI COMPLEXITY MANAGEMENT

CROSS REFERENCE TO RELATED APPLICATION(S)

This application claims the benefit of and priority to U.S. Provisional Application Ser. No. 63/235,600, entitled "Sidelink CSI complexity management" and filed on Aug. 20, 2021, which is expressly incorporated by reference herein in its entirety.

INTRODUCTION

Aspects of the present disclosure relate to wireless communications, and more particularly, to techniques for channel state information (CSI) reporting for sidelink communications.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect of the present disclosure provides a method for wireless communication by a first user equipment (UE). The method generally includes transmitting, to a second UE, an indication of a capability of the first UE for reporting sidelink channel state information (SL-CSI) to the second UE, receiving, from the second UE, a request for SL-CSI, and reporting SL-CSI to the second UE subject to the capability of the first UE for reporting SL-CSI to the second UE.

One aspect provides a method for wireless communication by a second UE. The method generally includes receiving, from a first UE, an indication of a capability of the first UE for reporting sidelink channel state information (SL-CSI) to the second UE, transmitting, to the first UE, a request for SL-CSI, and receiving, from the first UE, a SL-CSI report subject to the capability of the first UE for reporting SL-CSI to the second UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for channel state information (CSI) reporting between user equipments (UEs) involved in sidelink communications.

Measuring and reporting CSI takes significant processing resources. To keep a CSI reporting load manageable, a concept of CSI processing unit (CPU) has been considered for CSI reporting on a conventional cellular (Uu) link. Each CSI process in which a UE measures and reports CSI takes up a number of CPUs, depending on how involved the CSI computation is.

In other words, any given UE can support a limited number of CPUs at any given time, depending on its capabilities. For sidelink communications, however, a UE may have unicast links associated with several different UEs. Thus, managing CSI reporting load for sidelink communications may be more challenging than conventional CSI reporting to a base station (on the cellular/Uu link).

Aspects of the present disclosure provide techniques that may help manage sidelink CSI reporting loads. As will be described in greater detail below, a CSI reporting UE may allocate (pre-allocate) a portion of its CPUs to each UE for which it has an associated unicast sidelink. The CSI reporting UE may indicate the portion of CPUs allocated to each of its associated sidelink UEs. By pre-allocating a number of CPUs to each potential CSI requesting UE, constraints on the CSI reporting process may become fully known at the requesting entity, for consideration in deciding if or when to trigger more CSI reports.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2x may be used. The techniques may also be applied in the FR1 band (4.1 GHz to 7.125 GHz), for example, may be used for channel state information (CSI) feedback, control messages, or on control plane signaling.

Introduction to Wireless Communication Networks

Figure 1:
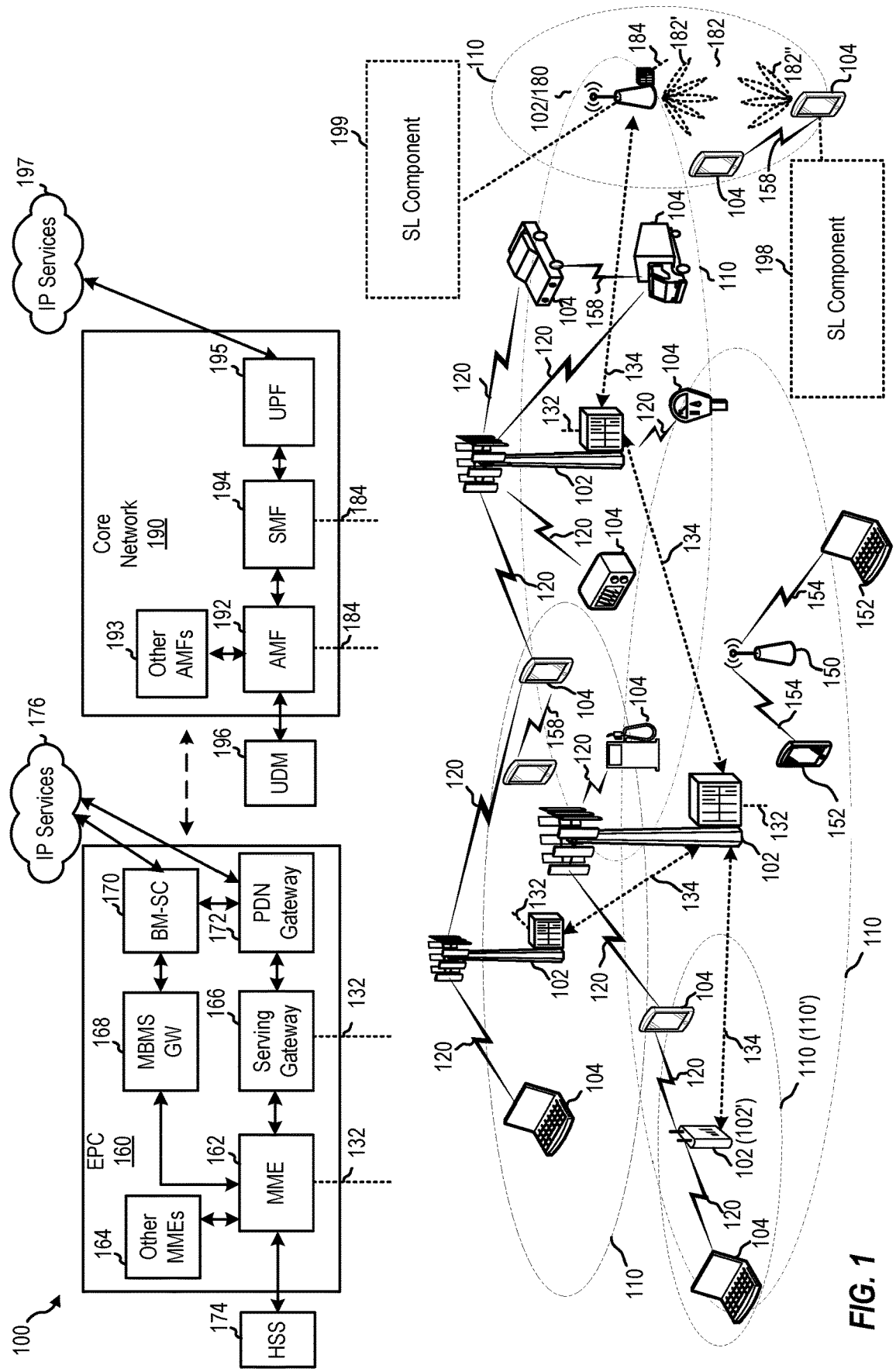
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102 (which may also be referred to herein as access node (AN) 102), user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 10:
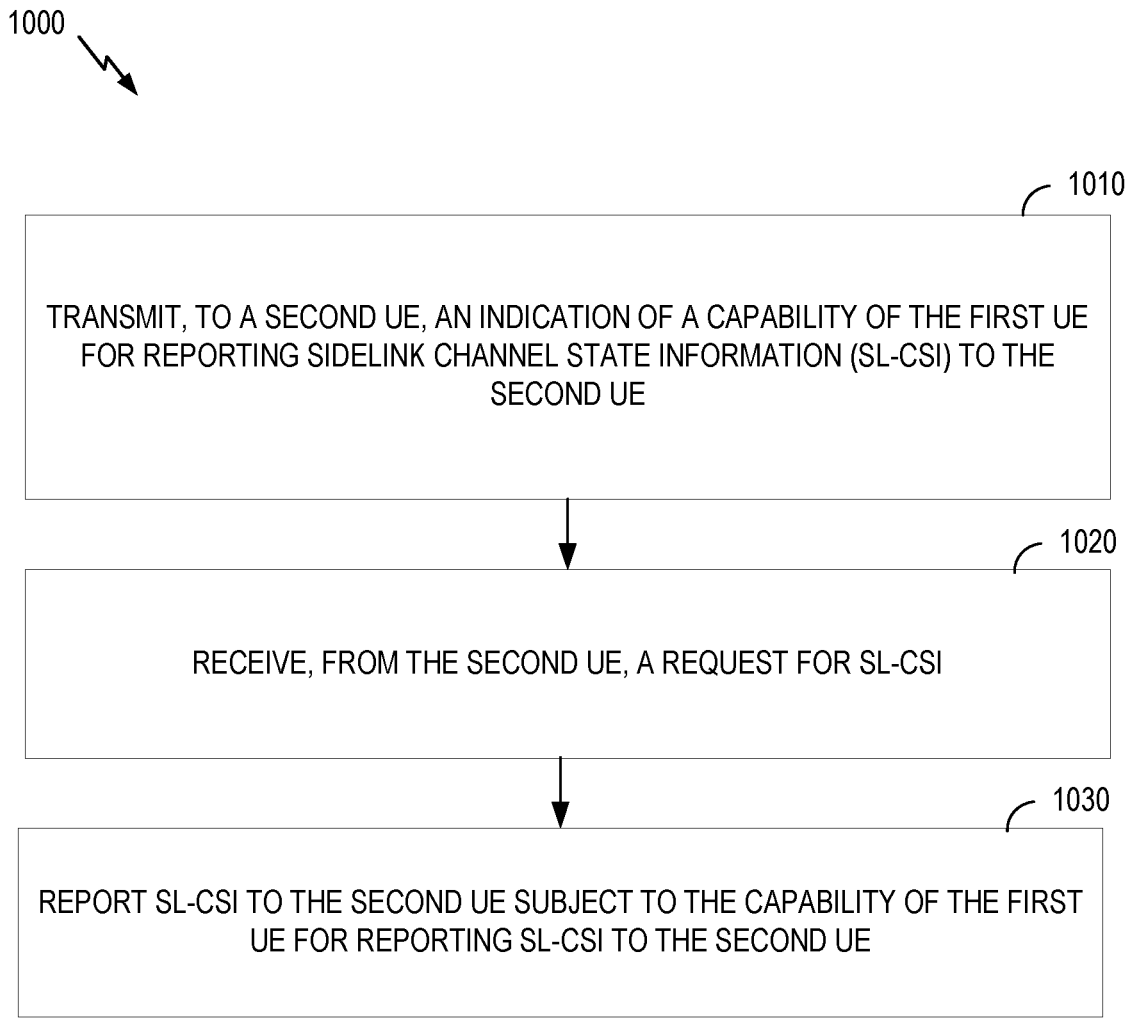
FIG. 10 is a flow diagram illustrating example operations for wireless communication by a first user equipment (UE), in accordance with certain aspects of the present disclosure.
Figure 11:
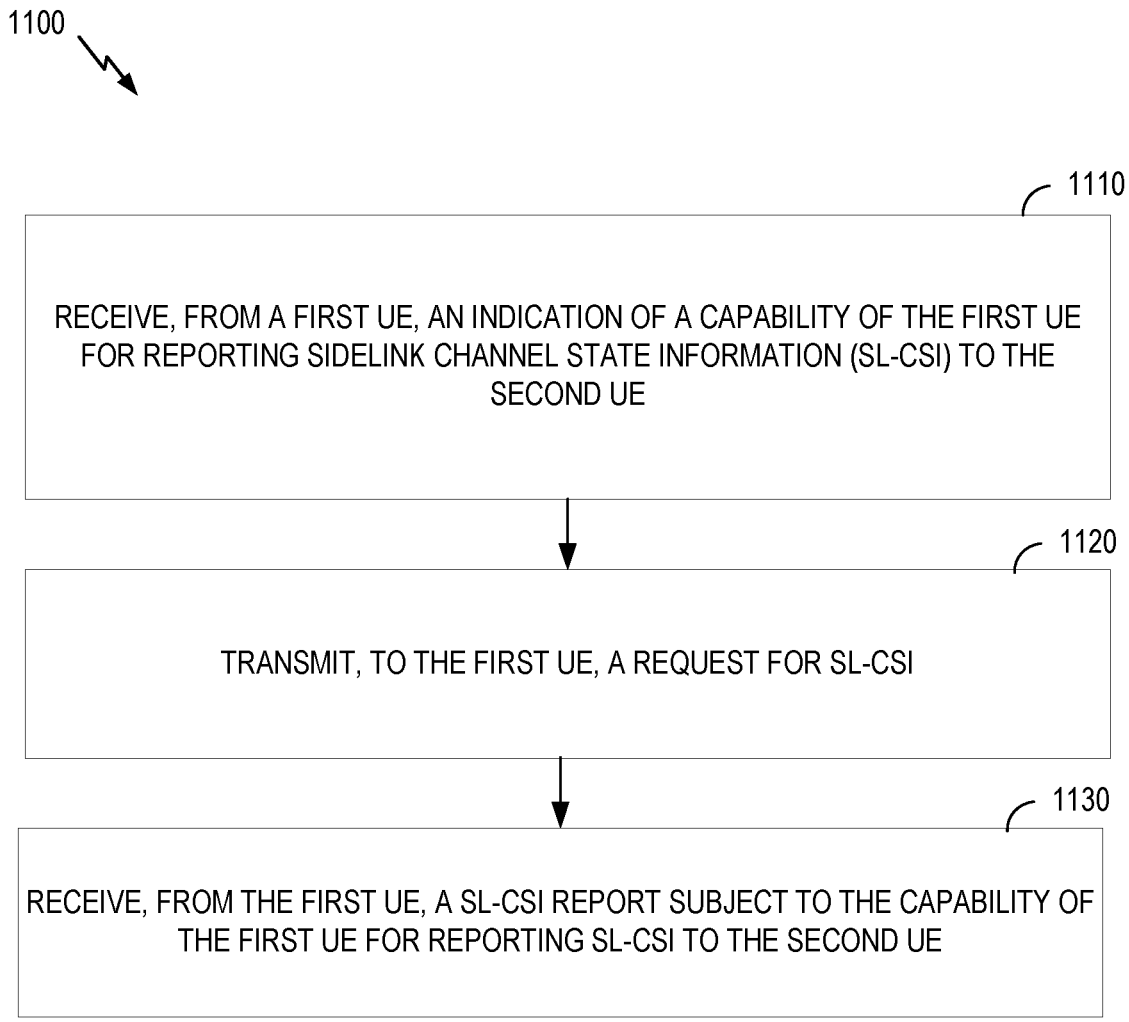
FIG. 11 is a flow diagram illustrating example operations for wireless communication by a second UE, in accordance with certain aspects of the present disclosure.

Wireless communication network 100 includes a SL component 198, which may configure a UE to perform operations for CSI reporting for sidelink according to operations 1000 of FIG. 10 and/or operations 1100 of FIG. 11. Wireless communication network 100 includes a SL component 199, which may configure a sidelink UE to perform CSI reporting for sidelink according to operations 1000 of FIG. 10 and/or operations 1100 of FIG. 11.

Figure 2:
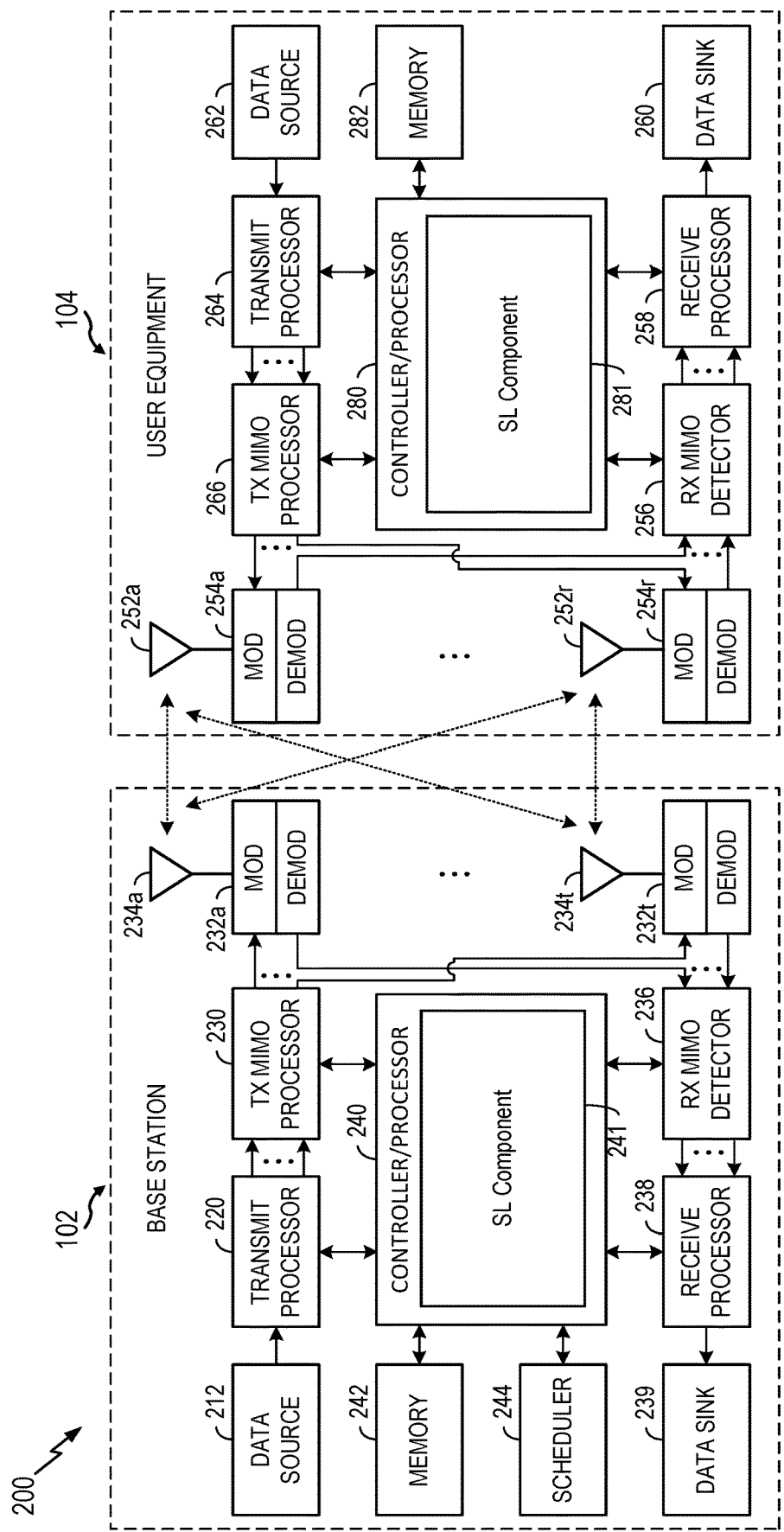
FIG. 2 is a block diagram conceptually illustrating aspects of an example base station and user equipment.

FIG. 2 is a diagram 200 that depicts aspects of an example base station (BS) 102 and a user equipment (UE) 104.

Generally, base station 102 includes various processors (e.g., 220, 230, 238, and 240), antennas 234a-232t, transceivers 232a-232t, which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a SL component 241, which may be representative of SL component 199 of FIG. 1. Notably, while depicted as an aspect of controller/processor 240, a SL component 241 may be implemented additionally or alternatively in various other aspects of base station 102 in other implementations.

Generally, user equipment 104 includes various processors (e.g., 258, 264, 266, and 280), antennas 252a-252r, transceivers 254a-254r, which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes SL component 281, which may be representative of SL component 198 of FIG. 1. Notably, while depicted as an aspect of controller/processor 280, SL component 281 may be implemented additionally or alternatively in various other aspects of user equipment 104 in other implementations.

Figure 3:
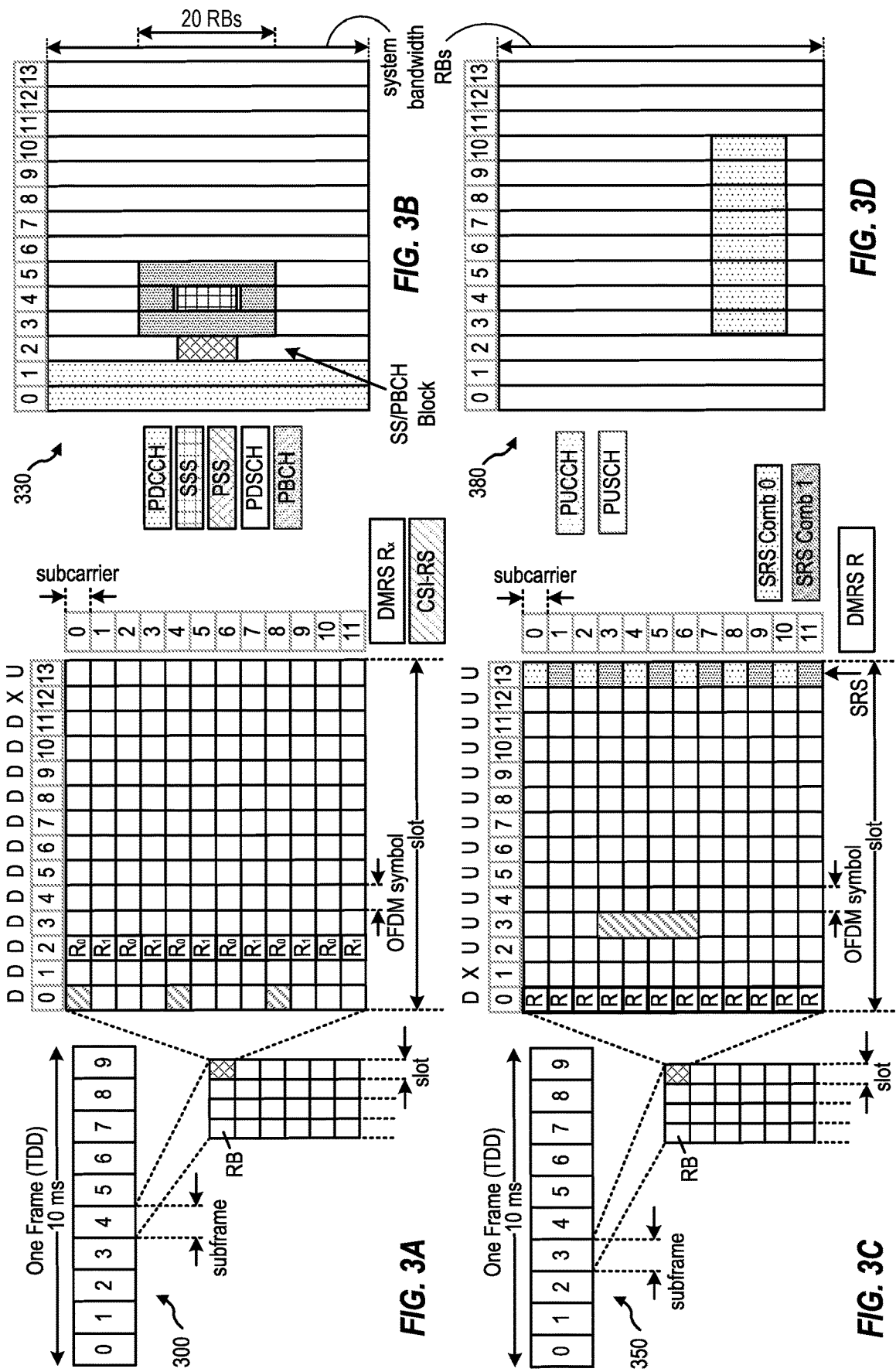
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe. In some aspects, UEs may be configured to communicate (e.g., via SL communications) using the frame format described with respect to diagrams 300, 330, 350, 380. A radio frame (e.g., as shown in diagram 300) may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS, during which SL communication may occur. Further discussions regarding FIG. 1, FIG. 2, and FIGS. 3A-3D are provided later in this disclosure.

Introduction to Sidelink

Figure 4:
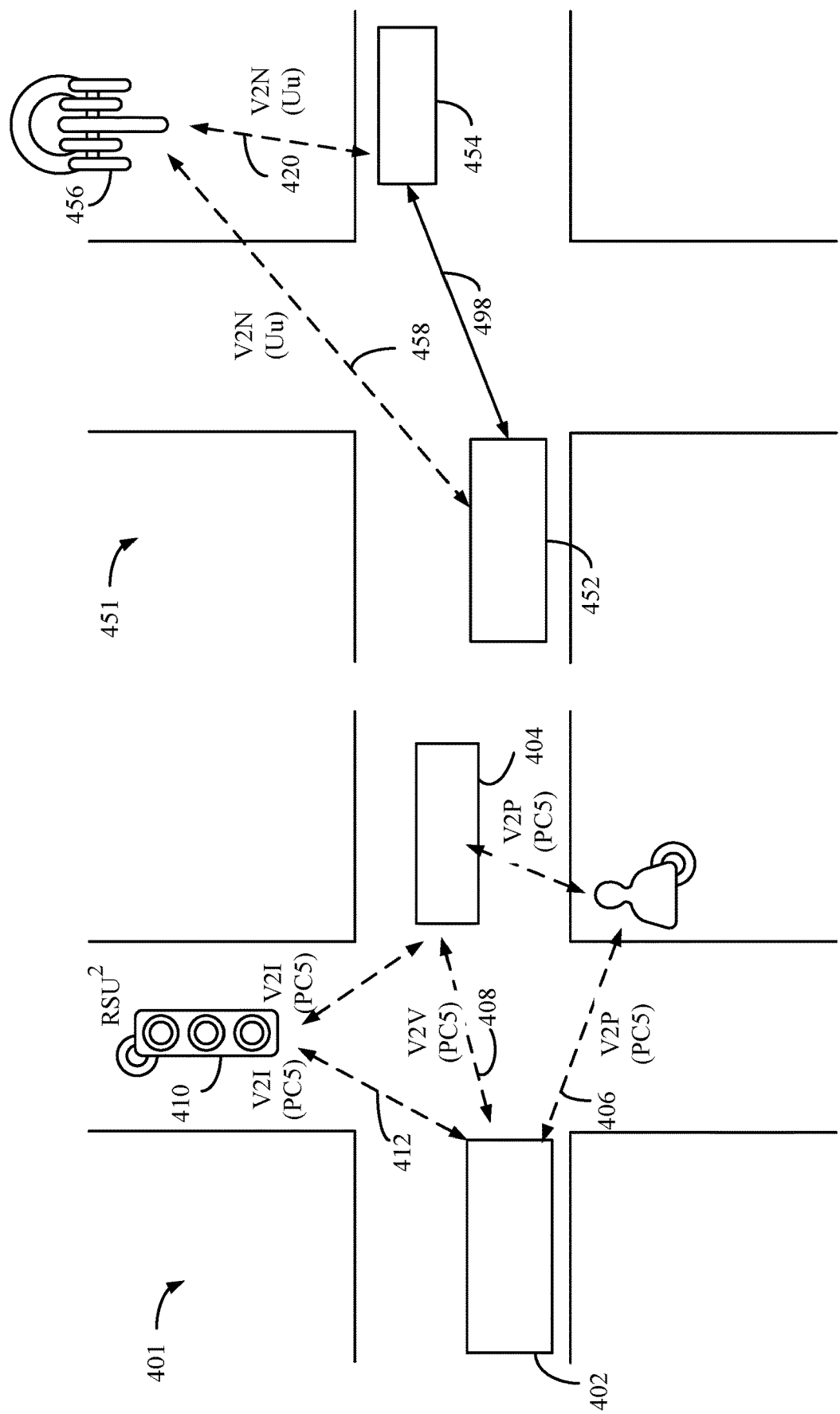
FIGS. 4A-4B depict various example sidelink communication scenarios.

FIGS. 4A and 4B show diagrammatic representations of example vehicle to everything (V2X) systems in accordance with some aspects of the present disclosure. For example, the UEs shown in FIGS. 4A and 4B may communicate via sidelink channels and may perform sidelink CSI reporting as described herein.

The V2X systems, provided in FIGS. 4A and 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE). As illustrated, UEs 452, 454 may communicate with each other using a sidelink (SL) 498.

Referring to FIG. 4A, a V2X system 401 (for example, including vehicle to vehicle (V2V) communications) is illustrated with UE 402 and UE 404 (e.g., vehicles). The first transmission mode allows for direct communication between different participants in a given geographic location. As illustrated, a vehicle can have a wireless communication link 406 with an individual (V2P) (for example, via a UE) through a PC5 interface. Communications between the UE 402 and UE 404 may also occur through a PC5 interface 408. In a like manner, communication may occur from a UE 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 401 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 451 for communication between a UE 452 (e.g., vehicle) and a UE 454 (e.g., vehicle) through a network entity 456. These network communications may occur through discrete nodes, such as a base station (for example, an eNB or gNB), that sends and receives information to and from (for example, relays information between) UEs 452, 454. The network communications through vehicle to network (V2N) links (e.g., Uu links 458 and 420) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed or unlicensed spectrum or a combination of both licensed and unlicensed spectrums.

Various sidelink channels may be used for sidelink communications, including, a physical sidelink control channel (PSCCH), a physical sidelink shared channel (PSSCH), and a physical sidelink feedback channel (PSFCH). The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Introduction to Sidelink CSI Reporting

For sidelink communications, Asynchronous Channel State Information (CSI) reporting may be supported for each set of paired UEs with a PC5 RRC connection (for sidelink unicast) for both Mode 1 and Mode 2 resource allocation in NR V2X. This asynchronous CSI reporting may be triggered by one of the paired UEs that sends a sidelink control information message (e.g., a SCI 2 with data) to the other UE with a CSI request field set to "1". The CSI may be reported by the other UE via a MAC CE.

Figure 5:
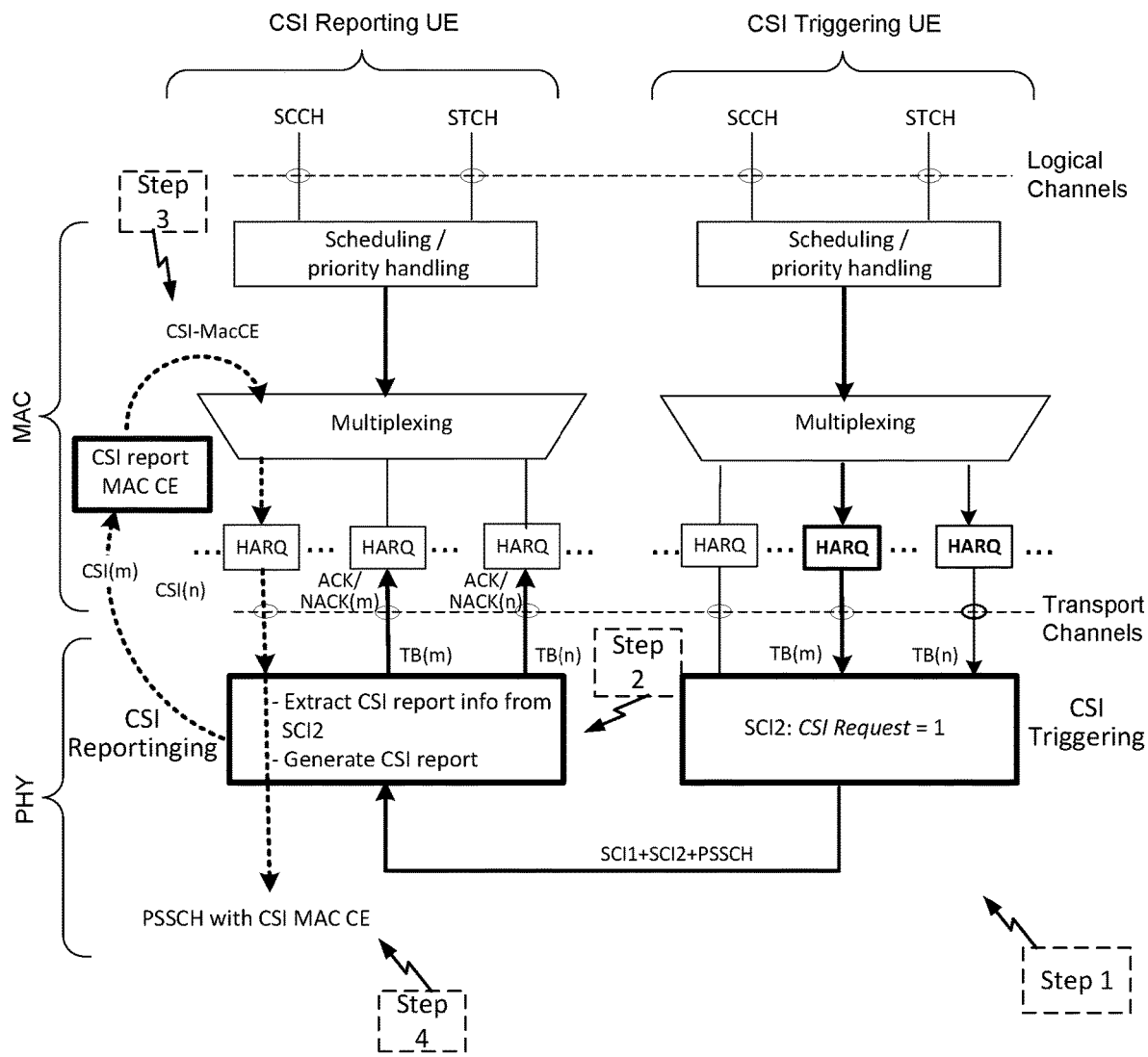
FIG. 5 depicts an example sidelink (SL) channel state information (CSI) processing unit (CPU) occupation time, in accordance with certain aspects of the present disclosure.

Sidelink CSI-reporting may be understood with reference to the diagram shown in FIG. 5. The diagram illustrates a sequence of operations performed at a CSI triggering UE and a CSI reporting UE.

As illustrated in FIG. 5, as a first step (step 1), the CSI triggering UE triggers CSI reports by sending an SCI2 containing a CSI request field/flag set to "1." At a second step (step 2), the CSI reporting UE extracts the CSI report information from each of the received SCI2. Based on the extracted information, the CSI reporting UE generates a CSI report. At a third step (step 3), the CSI reporting UE generates (composes) a CSI report MAC CE for the CSI request. At a fourth step (step 4), the CSI reporting UE multiplexes the CSI report MAC CE with other logic channels, for example, in a PSSCH.

Because many of the applications that could benefit from sidelink communication may be based on accurate and in-time channel information, this type of CSI reporting may be constrained by a latency specification for a CSI triggering UE via CSI report timer sl-CSI-ReportTimer. In conventional deployments, if the latency specification cannot be met, the SL-CSI reporting may be cancelled.

In other words, if the reporting UE cannot report CSI within the indicated latency bound, the CSI report is completely dropped. As a result, the Rx UE effectively controls whether CSI is reported or not.

Meeting CSI reporting latency objectives may be complicated when considering a case where a SL UE has established unicast links with multiple other UEs. For example, a UE serving as a relay or a primary node may be connected (via SL) to multiple remote UEs. In such cases, each of the remote UEs may request a CSI report.

Aspects of the present disclosure provide techniques that may help manage sidelink CSI reporting loads in such cases. For example, as noted above, to keep the sidelink CSI reporting load manageable, the concept of CSI processing units (CPUs) use for CSI reporting on a conventional cellular (Uu) link may be applied to sidelink CSI reporting.

Figure 6:
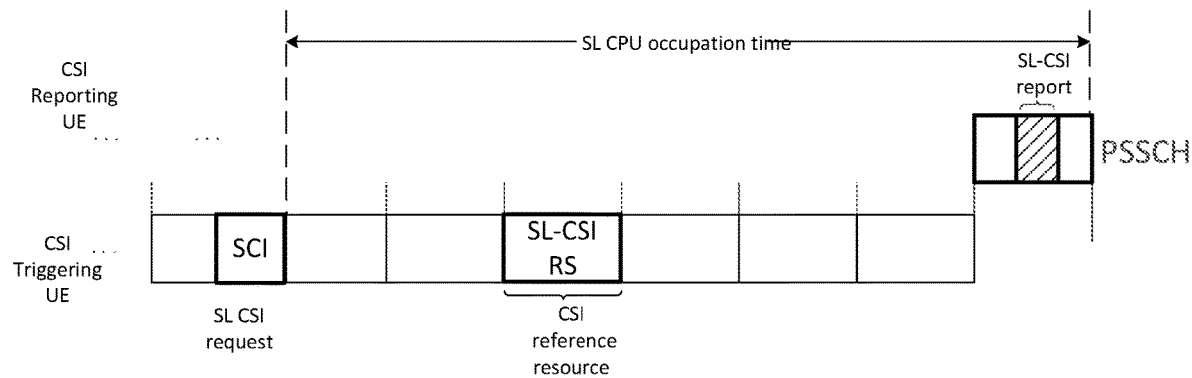
FIG. 6 depicts an example of SL CSI reporting, in accordance with certain aspects of the present disclosure.

As illustrated in FIG. 6, a sidelink CSI report process may occupy CPU(s) from a first symbol after a PSCCH (with SCI) triggering the CSI report until a last symbol of a PSSCH carrying the SL-CSI report.

In some cases, a CSI reporting UE may allocate (pre-allocate) a portion of its CPUs to each UE for which it has an associated unicast sidelink. In other words, any given UE can support a limited number of CPUs at any given time, depending on its capabilities. For sidelink communications, however, a UE may have unicast links associated with several different UEs. Thus, managing CSI reporting load for sidelink communications may be more challenging than conventional CSI reporting to a base station (on the cellular/Uu link). In some cases, sidelink CSI process may be prioritized across time, based on the CPUs allocated to each sidelink.

For Uu CSI reporting, a UE typically indicates the number of supported simultaneous CSI calculations $N_{CPU}$ (e.g., with a parameter simultaneousCSI-ReportsPerCC in a component carrier, and simultaneousCSI-ReportsAllCC across all component carriers). If a UE supports $N_{CPU}$ simultaneous CSI calculations it may be described as having $N_{CPU}$ CSI processing units for processing CSI reports. A number of CPUs may be considered occupied, based on the number of pending CSI processes, with the time a CPU is considered occupied (the "occupation time") depending on various factors, such as the type of CSI reporting/triggering.

If L CPUs are occupied for calculation of CSI reports in a given OFDM symbol, the UE has $N_{CPU}$-L unoccupied CPUs. If N CSI reports start occupying their respective CPUs on the same OFDM symbol on which $N_{CPU}$-L CPUs are unoccupied, where each CSI report n=0, . . . , N-1 corresponds to $O_{CPU}^{(n)}$, the maximum number of CPUs supported by the UE would be exceeded and the UE may perform prioritization to determine which CSI reports to process. For example, the UE may determine a priority value for each CSI report based on a number of factors for that report (e.g., whether aperiodic, semi-persistent, L1-RSRP/L1-SINR or not, serving cell index, or a report configuration ID). The UE may not be specified to update the N-M requested CSI reports with the lowest priority. A CSI report may be considered as having priority over another CSI report if, as a function of the parameters, it has a lower priority value than the other CSI report.

Based on sidelink CPUs allocated to different sidelink UEs, a CSI reporting UE may manage sidelink CSI reporting processing load. In some cases, sidelink CSI process may be prioritized across time, rather than in a first-in first out (FIFO) manner as used with Uu CSI reporting, based on the CPUs allocated to each sidelink.

The FIFO manner may be justifiable for Uu CSI reporting, given the UE is reporting to a single entity (e.g., a gNB) that is in charge of triggering CSI. However, for sidelink CSI reporting, one (CSI reporting) UE can be triggered to report sidelink CSI by multiple other UEs.

In some cases, the prioritization across time may be used. For example, if a CSI report is triggered and the UE does not have sufficient unoccupied CPUs to compute CSI, the CSI reporting UE may release some of the already occupied CPUs (e.g., to stop an ongoing CSI computation) and start the computation based on a new trigger if a more recently triggered CSI has a higher priority. Stopping ongoing CSI processing and starting a new CSI process may be challenging. Also, unlike Uu, each requesting UE may not be aware of whether its request will be accepted by the reporting UE or not. As a result, each requesting UE may not be fully in control of the CSI reporting output.

Example Sidelink CSI Complexity Management

Aspects of the present disclosure provide techniques that may help manage sidelink CSI reporting loads, for example, by allocating portions of a CSI reporting UE's CSI reporting resources to different CSI triggering UEs.

Figure 7:
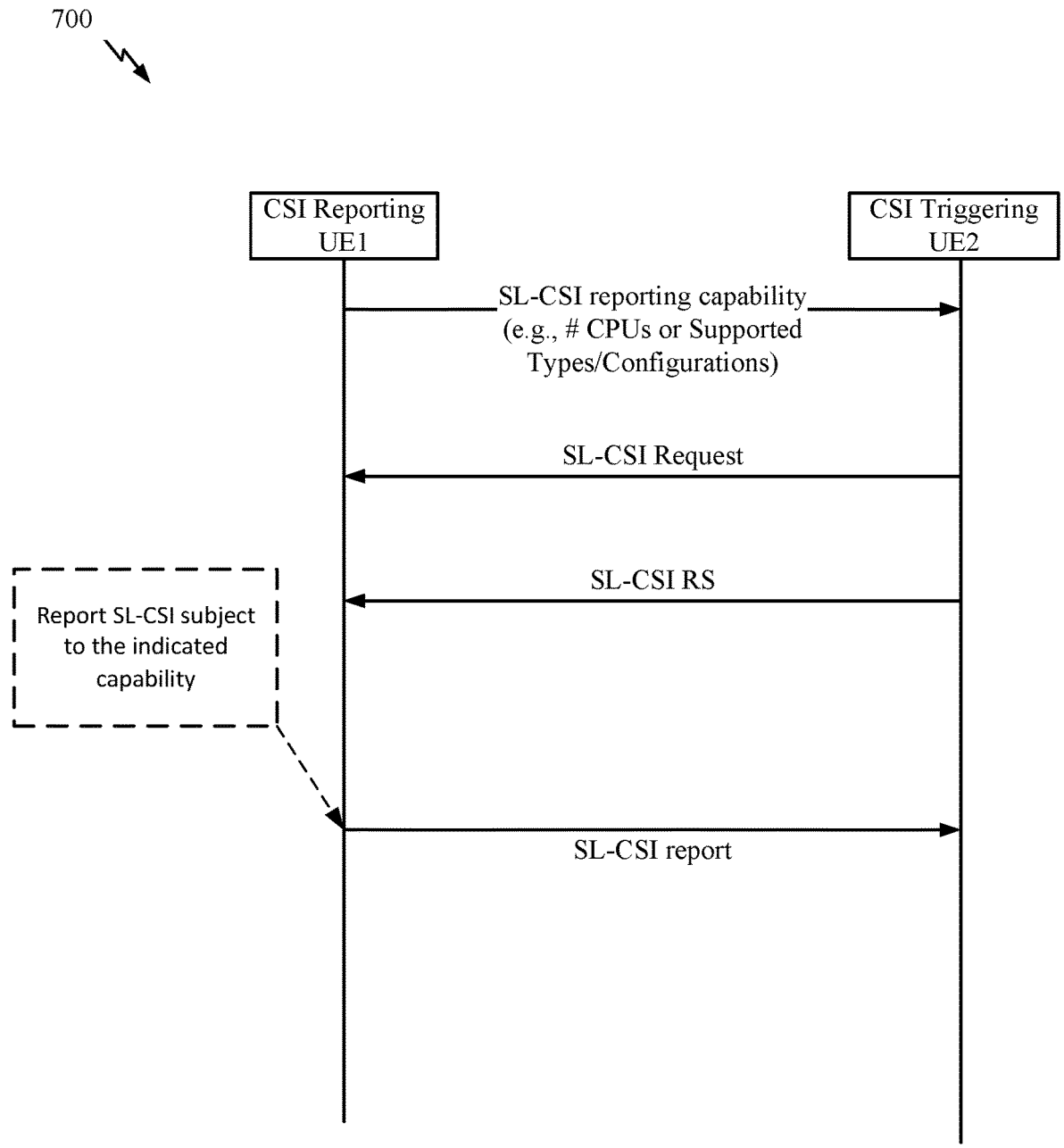
FIGS. 7-9 depicts call flow diagrams illustrating CSI reporting for sidelink, in accordance with certain aspects of the present disclosure.

In some cases, as illustrated in the call flow diagram 700 of FIG. 7, a first UE (e.g., CSI reporting UE1) may provide an indication to one or more second UEs (e.g., CSI Triggering UE2) of one or more sidelink CSI reporting capabilities of the first UE. In some cases, the indication may be provided when the two UEs establish their sidelink connection.

As illustrated in FIG. 7, the indicated SL-CSI reporting capability may be a number of CPUs, the reporting types, and/or reporting configurations that UE1 supports for reporting SL-CSI for the link between UE1 and UE2. When CSI triggering UE2 sends a SL-CSI request (e.g., via SCI2 with SL-CSI request flag set), UE1 may process the request subject to the indicated capability. For example, if an indicated number of SL CPUs is not exceeded and/or the request is for a supported type or configuration of SL CSI reporting, UE1 may process and report the requested SL-CSI.

As noted above, in some cases, a UE may allocate some portion of its CPUs to different sidelink UEs. For example, the UE may have unicast links associated with different source and destination ID pairs (with each pair representing a unicast link). Such a UE could itself pre-allocate a portion of its CPUs to each source/destination ID pairs.

Figure 8:
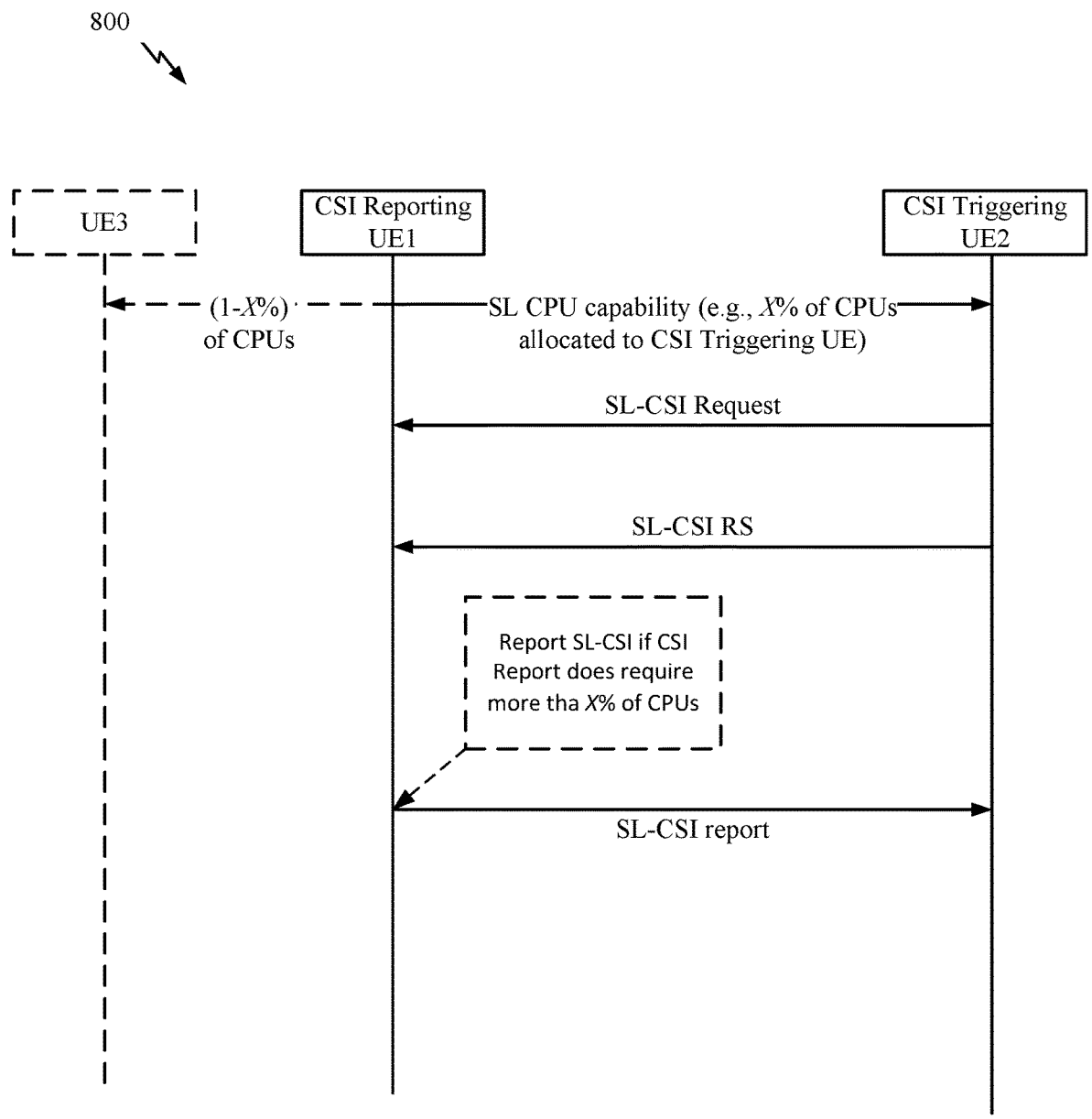

As an example, as illustrated in FIG. 8, the CSI reporting UE1 may have a unicast link with two UEs (UE2 and UE3). When establishing the connections, UE1 could allocate X % of its CPUs to the unicast link with UE2 and (1−X) % of its CPUs to the unicast link with UE3. UE1 may also indicate a maximum total number of sidelink CPUs supported, so UE2 and UE3 can determine the corresponding number of sidelink CPUs supported by UE1 for their link.

This percent allocation may represent, to UE2 and UE3, the maximum CPU capability of UE1 for their respective link. Thus, if UE2 triggers a CSI report that uses up to X % of the CPUs of UE1, it can expect to receive updated CSI from UE1 by the determined time. However, if UE2 triggers CSI report(s) which use more than X % of UE1's CPUs, UE1 may apply a prioritization scheme (e.g., and handle them in a FIFO manner similar to the procedure defined on Uu).

In this manner, by pre-allocating a number of CPUs to each potential CSI requesting UE, the process becomes fully known at the requesting entity. If a CSI triggering UE decides to trigger more CSI reports, it knows the consequences.

As depicted in the call flow diagram 800 of FIG. 8, the CPU allocation may be per unicast link. Further, the CPU allocation may be per direction. In other words, while UE1 may allocate X % of its CPUs to UE2, UE2 may allocate Y % of its CPUs to UE1. Thus, it may be beneficial that both UEs inform each other about the CPU allocation during the unicast link setup.

The proposed CPU allocation scheme may result in SL CSI reporting that is considered "reporting UE centric," in that the UE reporting CSI indicates the number of CPUs that can be allocated to the requesting UE.

In some cases, however, a similar solution may be adopted in a "requesting UE centric" manner. For example, the UE that is triggering CSI could request for the allocation of a certain portion or number of CPUs of the reporting UE. In such a case, the reporting UE may positively acknowledge (ACK) or negatively acknowledge (NACK) the request.

In some cases, the allocation of the CPUs may involve (a negotiation between) both the reporting and the requesting UEs. As an example, the reporting UE may determine the number of CPUs and the requesting UE may either accept or offer a different portion/number of CPUs. Similarly, the requesting UE could request a number of CPUs and the reporting UE could either accept the requested number or offer a different portion/number of CPUs.

As still another alternative, a network entity or designated UE may be responsible for allocating the number of CPUs across UEs. For example, a gNB or a primary UE (e.g., a relay or customer premise equipment—CPE) could be responsible for allocating the number of CPUs across UEs. In this case, the responsible entity may be aware of the source IDs a UE uses across different unicast links (e.g., and should be able to associate those IDs to a particular UE).

The sidelink CPU allocation described herein could be performed per resource pool, per sidelink bandwidth part (SL BWP), or per SL carrier. Additionally, or alternatively, the allocation could also be across multiple resource pools, SL BWPs, or SL carriers (e.g., subject to a total number of CPUs allocated across all resource pools, SL BWPs, or SL carriers). As an example, UE1 could indicate to a UE2 that it allocates a maximum of 2 CPUs for CC1, a maximum of 2 CPUs for CC2, and a total maximum of 3 CPUs across both CCs. Thus, valid allocations would include: 1 CPU for CC1 plus 2 CPUs for CC2; and 2 CPUs for CC1 plus 1 CPU for CC2 (=3 total CPUs in both cases).

There are various options for how to handle a case where a reporting UE has insufficient resources for reporting sidelink CSI for a corresponding request. One option, similar to an approach used for Uu CSI reporting, when there are not sufficient CPUs available for computing CSI, is for the CSI reporting UE to report stale information for CSI processes with smaller priorities. This stale information may be less than ideal and such transmissions may result in increased system congestion.

Figure 9:
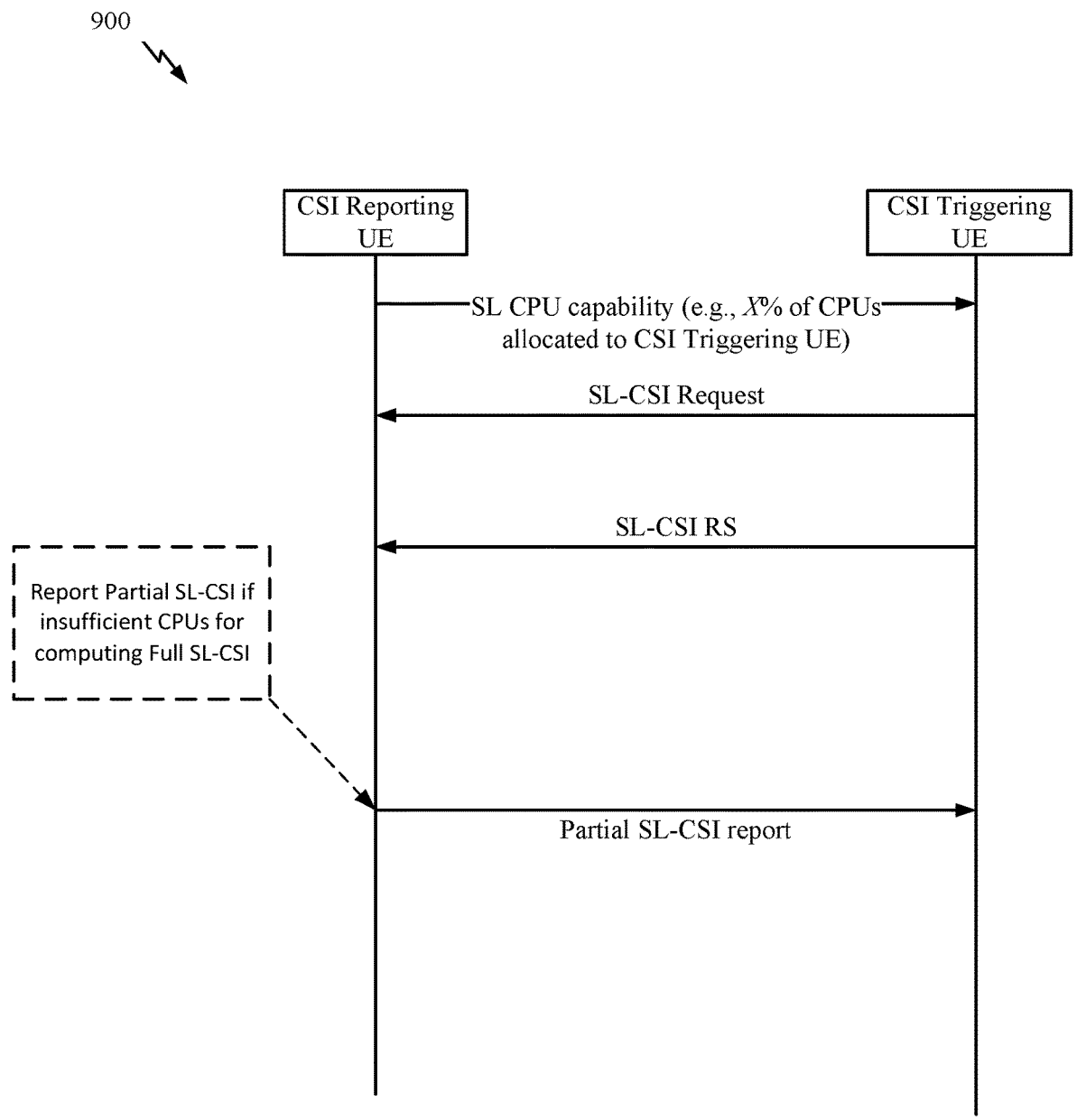

Another option, illustrated in the call flow diagram 900 of FIG. 9, is for a CSI reporting UE to report partial CSI when there are not sufficient CPUs available for computing CSI. For example, if a UE has N number of CPUs available and a certain request uses M CPUs (where M>1V), instead of reporting stale information, the UE could report partial CSI.

In some cases, the partial CSI could be a scaled back version of the requested CSI (that may use <=N CPUs to generate/report). As an example, if a Type-2 CSI (which is typically more complicated than Type-1 CSI, as Type-2 provides CSI per subband rather than wideband) is triggered but the UE has unoccupied CPUs sufficient to compute CSI based on Type-1, the CSI reporting UE may be allowed to report Type-1 CSI.

As another example, if a CSI report is triggered for a number S of SL carriers, but the UE has unoccupied CPUs enough for computing CSI for S' (where S'<S) carriers, the CSI reporting UE may be allowed to report CSI for S' carriers.

In some cases, after reporting partial CSI, the reporting UE could later report the requested CSI (e.g., the requested CSI type or carriers for which the CSI computation is updated) back to the triggering UE. For the remaining CSI processes, e.g., those for which CSI computation is not updated, the report can either be dropped or stale information can be reported.

As an alternative, the CSI reporting UE could indicate a time duration over which the remaining reports can be transmitted. For example, if UE1 can update CSI for CC1 and CC2, but not for CC3, UE1 may send the partial report (e.g., with updated CSI for CC1 and CC2) and also indicate to UE2 that the CSI report for CC3 will be updated and transmitted in the next CSI reporting occasion or the UE may indicated when the updated report for CC3 will be sent (e.g., in x number of slots).

In some cases, as an alternative or in addition to indicating the number of SL CPUs a reporting UE supports (e.g., in scenarios where CPU allocation is not implemented), different CSI reporting types or CSI reporting configurations supported by a UE may be defined.

For example, a first CSI report type (Type 1) may include wideband CSI, rank indicator (RI) and channel quality indicator (CQI), while a second CSI report type (Type 2) may include (per-)subband CSI for S number of subbands (e.g., and RI and CQI).

Sidelink UEs could inform each other about the CSI reporting types that are supported and for which updated CSI (without dropping) is expected if their processing time is overlapping. For example, UE1 could inform UE2 that Type 1 and Type 2 reporting can be triggered and while one is triggered but not reported, the other could be triggered and UE2 could expect to receive updated CSI at a determined time. A third type (e.g., Type 3) could be more involved (than either Type 1 or Type 2) and, if Type 3 is triggered while Type 1 and Type 2 are pending, the associated CSI may not be updated.

If CPU allocation is supported by (defined for) a CSI reporting UE, the CPUs may already account for the differences in CSI reporting types and/or configurations and effectively manage the overlapping scenarios described above. In other words, each CSI type may have an associated number of CPUs (that would count against the CPUs allocated to a particular sidelink).

Example Methods

FIG. 10 is a flow diagram illustrating example operations 1000 that may be performed a first UE for CSI reporting in accordance with aspects of the present disclosure. The operations 1000 may be implemented as software components that are executed and run on one or more processors (e.g., controller/processor 240 or 280 of FIG. 2). Further, the transmission and reception of signals by the UE in operations 1000 may be enabled, for example, by one or more antennas (e.g., antennas 252a-252r of FIG. 2). In certain aspects, the transmission and/or reception of signals by the entity may be implemented via a bus interface of one or more processors (e.g., controller/processor 240/280) obtaining and/or outputting signals.

The operations 1000 begin, at 1010, by transmitting, to a second UE, an indication of a capability of the first UE for reporting sidelink channel state information (SL-CSI) to the second UE. At 1020, the first UE receives, from the second UE, a request for SL-CSI. At 1030, the first UE reports SL-CSI to the second UE subject to the capability of the first UE for reporting SL-CSI to the second UE.

FIG. 11 is a flow diagram illustrating example operations 1000 that may be performed a second UE for CSI reporting in accordance with aspects of the present disclosure. The operations 1100 may be implemented as software components that are executed and run on one or more processors (e.g., controller/processor 240 or 280 of FIG. 2). Further, the transmission and reception of signals by the UE in operations 1100 may be enabled, for example, by one or more antennas (e.g., antennas 252a-252r of FIG. 2). In certain aspects, the transmission and/or reception of signals by the entity may be implemented via a bus interface of one or more processors (e.g., controller/processor 240/280) obtaining and/or outputting signals.

The operations 1100 begin, at 1110, by receiving, from a first UE, an indication of a capability of the first UE for reporting sidelink channel state information (SL-CSI) to the second UE. At 1120, the second UE transmits, to the first UE, a request for SL-CSI. At 1130, the second UE receives, from the first UE, a SL-CSI report subject to the capability of the first UE for reporting SL-CSI to the second UE.

Example Wireless Communication Devices

Figure 12:
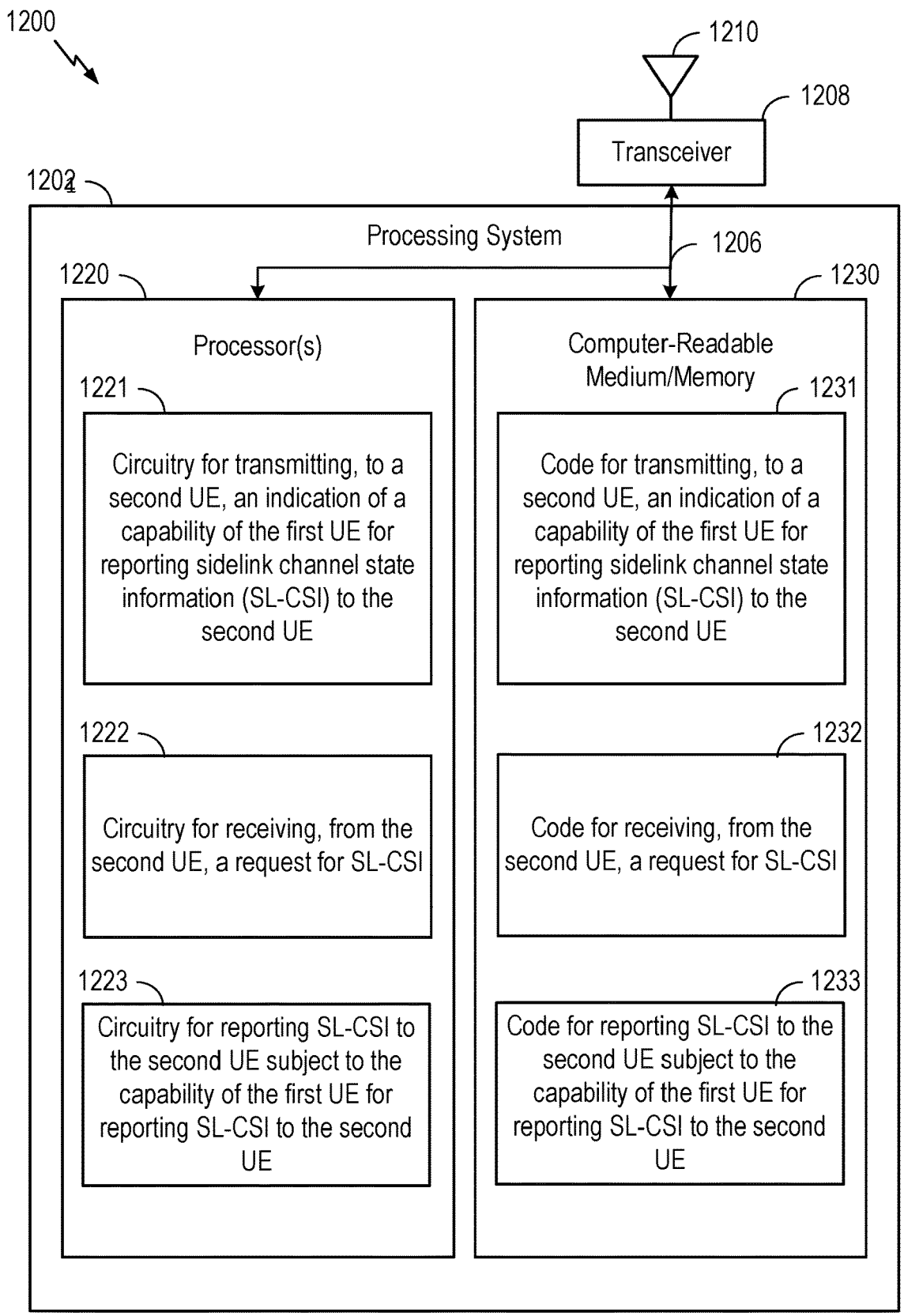
FIG. 12-13 depict devices with example components capable of performing operations for sidelink CSI reporting, in accordance with aspects of the present disclosure.

FIG. 12 depicts an example communication device 1200 that includes various components operable, configured, or adapted to perform operations for the techniques disclosed herein, such as the operations depicted and described with respect to FIG. 10. In some examples, communication device 1200 may be a user equipment 104 as described, for example with respect to FIGS. 1 and 2.

Communication device 1200 includes a processing system 1202 coupled to a transceiver 1208 (e.g., a transmitter and/or a receiver). Transceiver 1208 is configured to transmit (or send) and receive signals for the communication device 1200 via an antenna 1210, such as the various signals as described herein. Processing system 1202 may be configured to perform processing functions for communication device 1200, including processing signals received and/or to be transmitted by communication device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 10, or other operations for performing the various techniques discussed herein.

In the depicted example, computer-readable medium/memory 1230 stores code 1231 (e.g., an example of means for) for transmitting, to a second UE, an indication of a capability of the first UE for reporting sidelink channel state information (SL-CSI) to the second UE; code 1232 (e.g., an example of means for) for receiving, from the second UE, a request for SL-CSI; and code 1233 (e.g., an example of means for) for reporting SL-CSI to the second UE subject to the capability of the first UE for reporting SL-CSI to the second UE.

In the depicted example, the one or more processors 1220 include circuitry configured to implement the code stored in the computer-readable medium/memory 1230, including circuitry 1221 (e.g., an example of means for) for transmitting, to a second UE, an indication of a capability of the first UE for reporting sidelink channel state information (SL-CSI) to the second UE; circuitry 1222 (e.g., an example of means for) for receiving, from the second UE, a request for SL-CSI; and circuitry 1223 (e.g., an example of means for) for reporting SL-CSI to the second UE subject to the capability of the first UE for reporting SL-CSI to the second UE.

Various components of communication device 1200 may provide means for performing the methods described herein, including with respect to FIG. 10.

In some examples, means for transmitting or sending (or means for outputting for transmission) may include the transceivers 254a-254t and/or antenna(s) 252a-252r of the user equipment 104 illustrated in FIG. 2 and/or transceiver 1208 and antenna 1210 of the communication device 1200 in FIG. 12.

In some examples, means for receiving (or means for obtaining) may include the transceivers 254a-254t and/or antenna(s) 252a-252r of the user equipment 104 illustrated in FIG. 2 and/or transceiver 1208 and antenna 1210 of the communication device 1200 in FIG. 12.

In some examples, means for providing, means for generating, and/or means for selecting may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including SL component 281).

Notably, FIG. 12 is just use example, and many other examples and configurations of communication device 1200 are possible.

Figure 13:
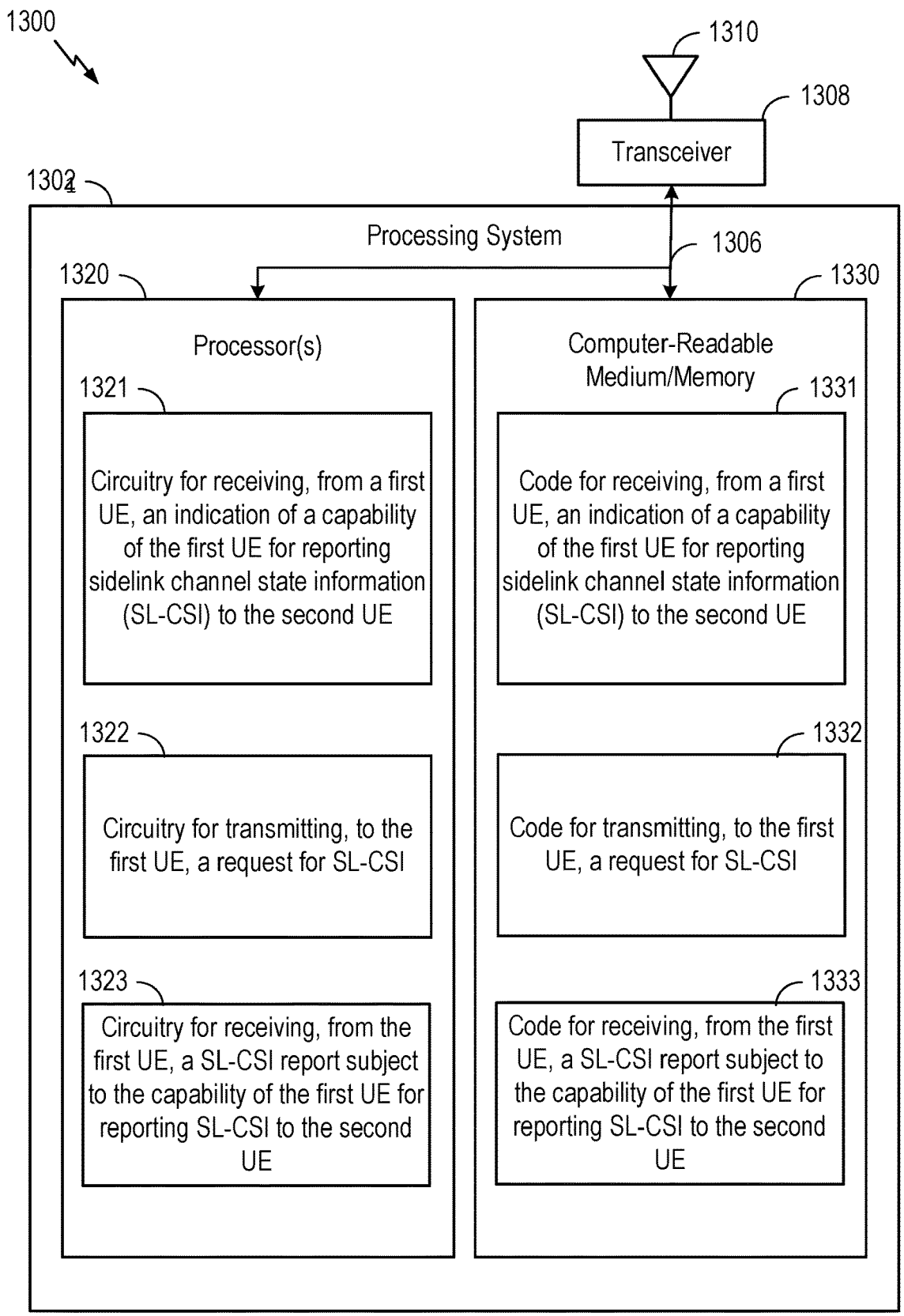

FIG. 13 depicts an example communication device 1300 that includes various components operable, configured, or adapted to perform operations for the techniques disclosed herein, such as the operations depicted and described with respect to FIG. 11. In some examples, communication device 1300 may be a user equipment 104 as described, for example with respect to FIGS. 1 and 2.

Communication device 1300 includes a processing system 1302 coupled to a transceiver 1308 (e.g., a transmitter and/or a receiver). Transceiver 1308 is configured to transmit (or send) and receive signals for the communication device 1300 via an antenna 1310, such as the various signals as described herein. Processing system 1302 may be configured to perform processing functions for communication device 1300, including processing signals received and/or to be transmitted by communication device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 11, or other operations for performing the various techniques discussed herein.

In the depicted example, computer-readable medium/memory 1330 stores code 1331 (e.g., an example of means for) for receiving, from a first UE, an indication of a capability of the first UE for reporting sidelink channel state information (SL-CSI) to the second UE; code 1332 (e.g., an example of means for) for transmitting, to the first UE, a request for SL-CSI; and code 1333 (e.g., an example of means for) for receiving, from the first UE, a SL-CSI report subject to the capability of the first UE for reporting SL-CSI to the second UE.

In the depicted example, the one or more processors 1320 include circuitry configured to implement the code stored in the computer-readable medium/memory 1330, including circuitry 1321 (e.g., an example of means for) for receiving, from a first UE, an indication of a capability of the first UE for reporting sidelink channel state information (SL-CSI) to the second UE; circuitry 1322 (e.g., an example of means for) for transmitting, to the first UE, a request for SL-CSI; and circuitry 1323 (e.g., an example of means for) for receiving, from the first UE, a SL-CSI report subject to the capability of the first UE for reporting SL-CSI to the second UE.

Various components of communication device 1300 may provide means for performing the methods described herein, including with respect to FIG. 11.

In some examples, means for transmitting or sending (or means for outputting for transmission) may include the transceivers 254a-254t and/or antenna(s) 252a-252r of the user equipment 104 illustrated in FIG. 2 and/or transceiver 1308 and antenna 1310 of the communication device 1300 in FIG. 13.

In some examples, means for receiving (or means for obtaining) may include the transceivers 254a-254t and/or antenna(s) 252a-252r of the user equipment 104 illustrated in FIG. 2 and/or transceiver 1308 and antenna 1310 of the communication device 1300 in FIG. 13.

In some examples, means for providing, means for generating, and/or means for selecting may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including SL component 281).

Notably, FIG. 13 is just use example, and many other examples and configurations of communication device 1300 are possible.

Example Clauses

Implementation examples are described in the following numbered clauses:

Clause 1: A method for wireless communication by a first user equipment (UE), comprising: transmitting, to a second UE, an indication of a capability of the first UE for reporting sidelink channel state information (SL-CSI) to the second UE; receiving, from the second UE, a request for SL-CSI; and reporting SL-CSI to the second UE subject to the capability of the first UE for reporting SL-CSI to the second UE.

Clause 2: The method of Clause 1, wherein the indication of the capability comprises an indication of a number of CSI processing units (CPUs) the first UE supports for reporting SL-CSI to the second UE.

Clause 3: The method of any one of Clauses 1-2, further comprising determining the number of CPUs the first UE supports for second UE as a percentage of a total number of CPUs the first UE supports for SL-CSI reporting.

Clause 4: The method of Clause 2, further comprising taking one or more actions if a request for SL-CSI from the second UE would use more than the indicated number of CPUs the first UE supports for reporting SL-CSI to the second UE.

Clause 5: The method of Clause 4, wherein the one or more actions comprise processing SL-CSI requests according to a prioritization procedure.

Clause 6: The method of Clause 4, wherein the one or more actions comprise reporting partial SL-CSI to the second UE.

Clause 7: The method of Clause 6, wherein reporting partial SL-CSI comprises reporting a second type of SL-CSI different than a first type of SL-CSI requested by the second UE.

Clause 8: The method of Clause 6, wherein reporting partial SL-CSI comprises reporting SL-CSI for fewer carriers than requested by the second UE.

Clause 9: The method of Clause 6, further comprising: dropping SL-CSI that was not reported with the partial SL-CSI; or reporting stale information for the SL-CSI that was not reported with the partial SL-CSI.

Clause 10: The method of Clause 6, further comprising: indicating a time duration over which the first UE can transmit SL-CSI that was not reported with the partial SL-CSI.

Clause 11: The method of any one of Clauses 2-10, further comprising: receiving, from the second UE, an indication of a number of CPUs the second UE supports for reporting SL-CSI to the first UE; and transmitting, to the second UE, one or more requests for SL-CSI subject to the indicated number of CPUs the second UE supports for reporting SL-CSI to the first UE.

Clause 12: The method of any one of Clauses 2-11, further comprising: receiving a request, from the second UE, that a portion or number of total number of CPUs the first UE supports is allocated for reporting SL-CSI to the second UE; and transmitting a response that at least one of: acknowledges the request or proposes a different portion or number of total number of CPUs, than requested, be allocated for reporting SL-CSI to the second UE.

Clause 13: The method of any one of Clauses 2-12, further comprising receiving signaling, from a network entity, indicating at least one of: the number of CPUs the first UE supports for reporting SL-CSI to the second UE; or a total number of CPUs the first UE supports for SL-CSI reporting.

Clause 14: The method of any one of Clauses 2-13, wherein the first UE allocates CPUs across one or more sidelink resource pools, across one or more sidelink bandwidth parts (SL BWPs), or across one or more SL carriers.

Clause 15: The method of any one of Clauses 1-14, wherein the indication of the capability comprises an indication of one or more SL-CSI reporting types or configurations the first UE supports for reporting SL-CSI to the second UE.

Clause 16: The method of Clause 15, wherein the indication of the capability comprises an indication of at least one of: that a first type of SL-CSI and second type of SL-CSI can be triggered; that while the first type of SL-CSI is triggered but not reported, the second type of SL-CSI can be triggered and sent at a later time; or that a third type of SL-CSI, if triggered while a request for at least one of the first or second type of SL-CSI is pending, the first UE will not report the third type of SL-CSI.

Clause 17: A method for wireless communication by a second user equipment (UE), comprising: receiving, from a first UE, an indication of a capability of the first UE for reporting sidelink channel state information (SL-CSI) to the second UE; transmitting, to the first UE, a request for SL-CSI; and receiving, from the first UE, a SL-CSI report subject to the capability of the first UE for reporting SL-CSI to the second UE.

Clause 18: The method of Clause 17, wherein the indication of the capability comprises an indication of a number of CSI processing units (CPUs) the first UE supports for reporting SL-CSI to the second UE.

Clause 19: The method of Clause 18, further comprising receiving a partial SL-CSI report if a request for SL-CSI from the second UE would use more than the indicated number of CPUs the first UE supports for reporting SL-CSI to the second.

Clause 20: The method of Clause 19, wherein the partial SL-CSI report comprises a second type of SL-CSI different than a first type of SL-CSI requested by the second UE.

Clause 21: The method of Clause 19, wherein the partial SL-CSI report comprises a SL-CSI report for fewer carriers than requested by the second UE.

Clause 22: The method of Clause 19, further comprising: receiving, from the first UE, an indication of a time duration over which the first UE can transmit SL-CSI that was not reported with the partial SL-CSI.

Clause 23: The method of any one of Clauses 18-22, further comprising: transmitting, to the first UE, an indication of a number of CPUs the second UE supports for reporting SL-CSI to the first UE.

Clause 24: The method of any one of Clauses 18-23, further comprising: transmitting a request, to the first UE, that a portion or number of total number of CPUs the first UE supports is allocated for reporting SL-CSI to the second UE; and receiving a response, from the first UE, that at least one of: acknowledges the request or proposes a different portion or number of total number of CPUs, than requested, be allocated for reporting SL-CSI to the second UE.

Clause 25: The method of any one of Clauses 18-24, further comprising receiving signaling, from a network entity, indicating at least one of: the number of CPUs the first UE supports for reporting SL-CSI to the second UE; or a total number of CPUs the first UE supports for SL-CSI reporting.

Clause 26: The method of any one of Clauses 17-26, wherein the indication of the capability comprises an indication of one or more SL-CSI reporting types or configurations the first UE supports for reporting SL-CSI to the second UE.

Clause 27: The method of Clause 26, wherein the indication of the capability comprises an indication of at least one of: that a first type of SL-CSI and second type of SL-CSI can be triggered; that while the first type of SL-CSI is triggered but not reported, the second type of SL-CSI can be triggered and sent at a later time; or that a third type of SL-CSI, if triggered while a request for at least one of the first or second type of SL-CSI is pending, the first UE will not report the third type of SL-CSI.

Clause 28: An apparatus for wireless communications, comprising means for performing the method of any one or more of Clauses 1-27.

Clause 29: An apparatus for wireless communications, comprising a memory and a processor coupled with the memory, the memory and the processor configured to perform the method of any one or more of Clauses 1-27.

Clause 30: A computer-readable medium having instructions stored thereon which, when executed by a processor, performs the method of any one or more of Clauses 1-27.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used to refer to different entities related to a network entity. In some aspects, the network entity may be implemented as an aggregated base station, a disaggregated base station, an integrated access and backhaul (IAB) node, a relay node, a sidelink node, or the like. In some aspects, the network entity may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 102/180 may operate in a traditional sub-6 GHz spectrum, in millimeter wave (mmWave) frequencies, and/or near mmWave frequencies in communication with the UE 104. When the gNB 102/180 operates in mmWave or near mmWave frequencies, the gNB 102/180 may be referred to as an mmWave base station. The gNB 102/180 may also communicate with one or more UEs 104 via a beam formed connection 182 (e.g., via beams 182' and 182").

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink (SL) channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceiver 232a-transceiver 232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antenna 234a-antenna 234t, respectively.

At UE 104, antenna 252a—antenna 252r may receive the downlink signals from the BS 102 and may provide received signals to the demodulators (DEMODs) in transceiver 254a—transceiver 254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of NR and LTE sidelink co-channel co-existence in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first user equipment (UE), comprising:
a memory; and
a processor coupled to the memory, wherein the processor is configured to:
transmit, to a second UE, an indication of a capability of the first UE for reporting sidelink channel state information (SL-CSI) to the second UE;
determine a number of CSI processing units (CPUs) the first UE supports for the second UE as a percentage of a total number of CPUs the first UE supports for SL-CSI reporting;
receive, from the second UE, a request for SL-CSI, wherein the request is based on the indication; and
report, based on the request, SL-CSI to the second UE.

2. A first user equipment (UE), comprising:
a memory; and
a processor coupled to the memory, wherein the processor is configured to:
transmit, to a second UE, an indication of a capability of the first UE for reporting sidelink channel state information (SL-CSI) to the second UE, wherein the indication of the capability comprises an indication of a number of CSI processing units (CPUs) the first UE supports for reporting SL-CSI to the second UE;
receive, from the second UE, a request for SL-CSI, wherein the request is based on the indication; and
report partial SL-CSI if the request would cause more than the indicated number of CPUs the first UE supports for reporting SL-CSI to be used, wherein, to report partial SL-CSI, the processor is configured to report a second type of SL-CSI different than a first type of SL-CSI requested by the second UE.

3. A first user equipment (UE), comprising:
a memory; and
a processor coupled to the memory, wherein the processor is configured to:
transmit, to a second UE, an indication of a capability of the first UE for reporting sidelink channel state information (SL-CSI) to the second UE, wherein the indication of the capability comprises an indication of a number of CSI processing units (CPUs) the first UE supports for reporting SL-CSI to the second UE;
receive, from the second UE, a request for SL-CSI, wherein the request is based on the indication; and
report partial SL-CSI if the request would cause more than the indicated number of CPUs the first UE supports for reporting SL-CSI to be used, wherein, to report partial SL-CSI according to the one or more actions, the processor is configured to report SL-CSI for fewer carriers than requested by the second UE.

4. A first user equipment (UE), comprising:
a memory; and
a processor coupled to the memory, wherein the processor is configured to:
transmit, to a second UE, an indication of a capability of the first UE for reporting sidelink channel state information (SL-CSI) to the second UE, wherein the indication of the capability comprises an indication of a number of CSI processing units (CPUs) the first UE supports for reporting SL-CSI to the second UE;
receive, from the second UE, a request for SL-CSI, wherein the request is based on the indication;
report partial SL-CSI if the request would cause more than the indicated number of CPUs the first UE supports for reporting SL-CSI to be used; and
indicate a time duration over which the first UE can transmit SL-CSI that was not reported with the partial SL-CSI.

5. A first user equipment (UE), comprising:
a memory; and
a processor coupled to the memory, wherein the processor is configured to:
transmit, to a second UE, an indication of a capability of the first UE for reporting sidelink channel state information (SL-CSI) to the second UE, wherein the indication of the capability comprises an indication of a number of CSI processing units (CPUs) the first UE supports for reporting SL-CSI to the second UE;
receive, from the second UE, a request for SL-CSI, wherein the request is based on the indication;
report, based on the request, SL-CSI to the second UE;
receive a second request, from the second UE, that a portion or number of a total number of CPUs the first UE supports is allocated for reporting SL-CSI to the second UE; and
transmit a response that at least one of:
acknowledges the request,
proposes a different portion of CPUs than requested based on the second request be allocated for reporting SL-CSI to the second UE, or
proposes a different number of CPUs than requested based on the second request be allocated for reporting SL-CSI to the second UE.

6. The first UE of claim 2, wherein the processor is configured to receive signaling, from a network entity, indicating at least one of:
the number of CPUs the first UE supports for reporting SL-CSI to the second UE; or
a total number of CPUs the first UE supports for SL-CSI reporting.

7. The first UE of claim 2, wherein the first UE allocates the CPUs across one or more sidelink resource pools, across one or more sidelink bandwidth parts (SL BWPs), or across one or more SL carriers.

8. The first UE of claim 3, wherein the indication of the capability comprises an indication of one or more SL-CSI reporting types or configurations the first UE supports for reporting SL-CSI to the second UE.

9. The first UE of claim 8, wherein the indication of the capability comprises an indication of at least one of:
that a first type of SL-CSI and a second type of SL-CSI can be triggered;
that while the first type of SL-CSI is triggered but not reported, the second type of SL-CSI can be triggered and sent at a later time; or
that a third type of SL-CSI cannot be reported if the third type of SL-CSI is triggered while a request for at least one of the first or second type of SL-CSI is pending.

10. A second user equipment (UE), comprising:
a memory; and
a processor coupled to the memory, wherein the processor is configured to:

receive, from a first UE, an indication of a capability of the first UE for reporting sidelink channel state information (SL-CSI) to the second UE, wherein the indication of the capability comprises an indication of a number of CSI processing units (CPUs) the first UE supports for reporting SL-CSI to the second UE;

transmit, to the first UE, a request for SL-CSI, wherein the request is based on the indication; and receive, from the first UE based on the request, a partial SL-CSI report, wherein a second type of SL-CSI different than a first type of SL-CSI requested by the second UE.

11. A second user equipment (UE) comprising:
a memory; and
a processor coupled to the memory, wherein the processor is configured to:
receive, from a first UE, an indication of a capability of the first UE for reporting sidelink channel state information (SL-CSI) to the second UE, wherein the indication of the capability comprises an indication of a number of CSI processing units (CPUs) the first UE supports for reporting SL-CSI to the second UE;
transmit, to the first UE, a request for SL-CSI, wherein the request is based on the indication; and
receive, from the first UE based on the request, a partial SL-CSI report for fewer carriers than requested by the second UE.

12. A second user equipment (UE), comprising:
a memory; and
a processor coupled to the memory, wherein the processor is configured to:
receive, from a first UE, an indication of a capability of the first UE for reporting sidelink channel state information (SL-CSI) to the second UE, wherein the indication of the capability comprises an indication of a number of CSI processing units (CPUs) the first UE supports for reporting SL-CSI to the second UE;
transmit, to the first UE, a request for SL-CSI, wherein the request is based on the indication;
receive, from the first UE based on the request, a partial SL-CSI report; and
receive, from the first UE, an indication of a time duration over which the first UE can transmit SL-CSI that was not reported with the partial SL-CSI.

13. The second UE of claim 10, wherein the processor is configured to:
transmit, to the first UE, an indication of a number of CPUs the second UE supports for reporting SL-CSI to the first UE.

14. The second UE of claim 10, wherein the processor is configured to receive signaling, from a network entity, indicating at least one of:
the number of CPUs the first UE supports for reporting SL-CSI to the second UE; or
a total number of CPUs the first UE supports for SL-CSI reporting.

15. The second UE of claim 11, wherein the indication of the capability comprises an indication of one or more SL-CSI reporting types or configurations the first UE supports for reporting SL-CSI to the second UE.

16. The second UE of claim 15, wherein the indication of the capability comprises a third indication of at least one of:
that a first type of SL-CSI and a second type of SL-CSI can be triggered;
that while the first type of SL-CSI is triggered but not reported, the second type of SL-CSI can be triggered and sent at a later time; or
that a third type of SL-CSI, if triggered while a request for at least one of the first or second type of SL-CSI is pending, the first UE will not report the third type of SL-CSI.

17. The first UE of claim 5, wherein the response acknowledges the request.

18. The first UE of claim 5, wherein the response proposes the different portion of CPUs be allocated for reporting SL-CSI to the second UE.

19. The first UE of claim 5, wherein the response proposes the different number of CPUs be allocated for reporting SL-CSI to the second UE.

20. The second UE of claim 11, wherein the processor is configured to:
transmit, to the first UE, an indication of a number of CPUs the second UE supports for reporting SL-CSI to the first UE.

21. The second UE of claim 12, wherein the processor is configured to:
transmit, to the first UE, an indication of a number of CPUs the second UE supports for reporting SL-CSI to the first UE.

* * * * *